J. A. NEATHAMMER.
GEAR HOUSING.
APPLICATION FILED JUNE 11, 1921.

1,423,675. Patented July 25, 1922.

Witness,
Wm. E. Anderson

Inventor
Joseph A. Neathammer,
By Rummler & Rummler,
Attorneys

UNITED STATES PATENT OFFICE.

JOSEPH A. NEATHAMMER, OF ALHAMBRA, ILLINOIS.

GEAR HOUSING.

1,423,675.   Specification of Letters Patent.   Patented July 25, 1922.

Application filed June 11, 1921. Serial No. 476,933.

*To all whom it may concern:*

Be it known that I, JOSEPH A. NEATHAMMER, a citizen of the United States of America, and a resident of Alhambra, county of Madison, State of Illinois, have invented certain new and useful Improvements in Gear Housings, of which the following is a specification.

The main objects of this invention are to provide an improved form of gear housing for use with a train of gears wherein one of the gears is fixed on a driven member for rotating the same; and to provide a gear housing of this kind which is especially designed for use on a tractor in which a driving gear is fixed on each of the drive wheels.

An illustrative embodiment of this invention is shown in the accompanying drawings, wherein—

In the form shown, the invention is applied to a farm tractor having the usual drive wheels 1, supported on an axle 2, and connected to the engine (not shown) by a train of gears involving a driving or bull gear 3, and a pinion 4.

Figure 1:
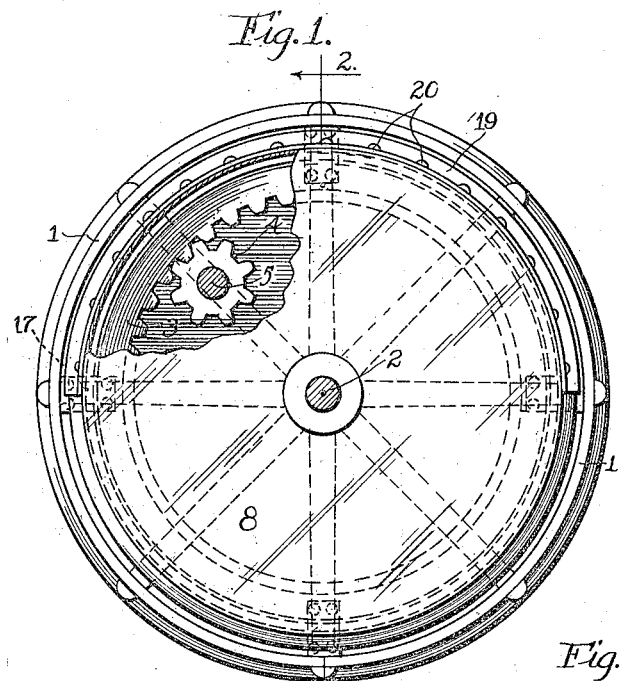
Figure 1, is a side elevation, showing the gear housing applied to a tractor drive wheel, part of the housing being broken away for the sake of clearness.
Figure 2:
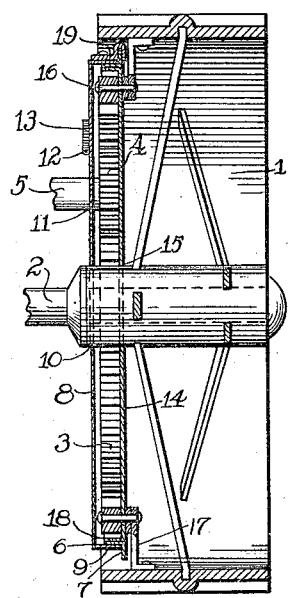
Figure 2, is a vertical section taken on the line 2—2 of Figure 1.
Figure 5:
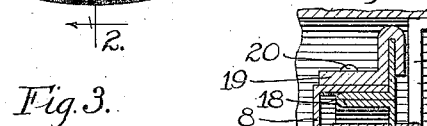
Figure 5, is an enlarged detail of a certain part of the mechanism shown in Figure 2.
Figure 3:
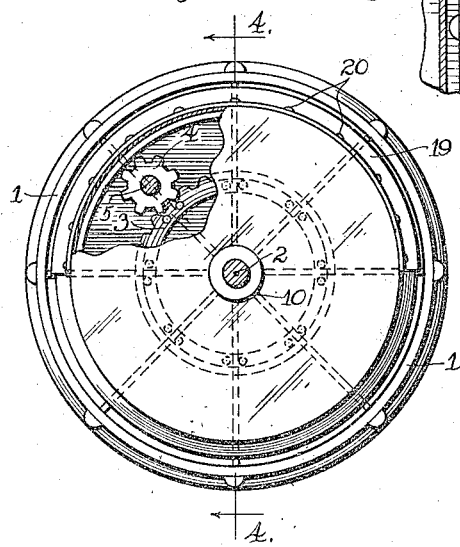
Figure 3, is a view similar to Figure 1, showing another type of driving gear.
Figure 4:
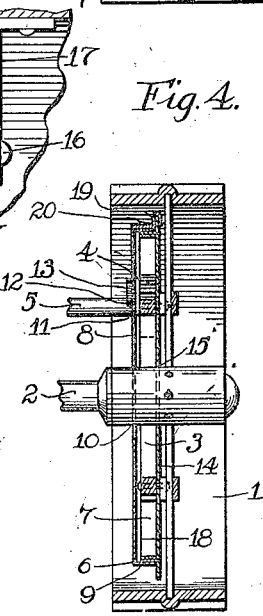
Figure 4, is a vertical section taken on the line 4—4 of Figure 3.

A driving gear 3 is rigidly secured to each of the drive wheels and is located between the spokes of the wheel and the frame of the tractor. On some forms of tractors, the driving gears are of the internal or annular gear type, as shown in Figures 1 and 2, whereas in other tractors, spur gears are used, as shown in Figures 3 and 4. The present invention is adapted for use with either of these two types of driving gears. Each of the driving gears meshes with a pinion 4, fixed on a drive shaft 5, which is journaled in the tractor frame and connected to be driven by the engine.

In the form shown, the improved form of gear housing comprises a cup-shaped stationary part 6, and a rotatable part 7 arranged in interfitting relation.

The part 6 is rigidly secured to the frame of the tractor and comprises a disk 8 having a transversely disposed annular peripheral flange 9, and a centrally located aperture 10, through which extends the supporting axle 2 of the drive wheels. The disk 8 has an opening 11, through which extends the pinion shaft 5, and an aperture 12, through which the grease may be inserted for lubricating the gears. Seated in the aperture 12 is a screw cap 13.

The rotatable part 7 comprises a disk 14, arranged in substantially parallel spaced relation to the disk 8, and having a centrally located opening 15 through which extends the supporting axle 2 and the hub of the drive wheel. In the form shown, the disk 14 is fastened to the driving gear by bolts 16, carried by brackets 17 which are fixed on the rim of the drive wheel. Pressed out from the disk 14 and located inwardly from the periphery thereof is an annular flange 18 which is arranged in telescopic sliding relation with the flange 9 of the stationary part. In cases where the driving gears are of the internal gear type, the flange 18 of the rotatable disk may be omitted, if desired. In such cases, the cup-shaped stationary part 6 is formed to fit closely around the rim of the annular gear 3, to which is rigidly secured the disk 14. The rim of the disk 14 extends beyond the driving gear into sliding engagement with the rim of the flange 9 so as to prevent any dirt from entering the housing.

Mounted on the upper part of the stationary disk is an arcuate guard 19, extending half way around the gear housing and detachably secured to the flange 9 by bolts 20. The free edge of the guard is bent over the rim of the disk 14 to form a protecting flange which is arranged to deflect from the housing any particles of falling dirt which may be carried by the rim of the drive wheels.

In the operation of the device, the shaft 5 drives the wheels 1 through the action of the gears 3 and pinions 4. The movable parts 7 of the housings rotate with the drive wheels relatively of the stationary parts 6 which are secured to the tractor frame.

Although but one specific embodiment of this invention has been herein shown and described, it will be understood that numerous details of the construction shown may be altered or omitted without departing from the spirit of this invention as defined by the following claim.

I claim:—

A gear housing for use with a train of gears wherein one of the gears is fixed on a driven member for rotating the same, said housing comprising a stationary disc and a rotatable disc arranged axially and disposed in substantially parallel spaced relation, the opposed faces of said discs having interfitting annular flanges arranged to form a peripheral wall for said housing, said rotatable disc being adapted to be fixed to rotate with said driven member, and an arcuate guard rigidly mounted on the upper part of said stationary disc, said guard being formed to have interfitting engagement with the rim of said rotatable disc.

Signed at Chicago this 8th day of June, 1921.

JOSEPH A. NEATHAMMER.